Patented June 14, 1938

2,120,430

UNITED STATES PATENT OFFICE 2,120,430

STABILIZED SOLID HYDROGEN PEROXIDE PREPARATION

Alfred Rieche, Wolfen Kreis Bitterfeld, Germany, assignor to Winthrop Chemical Company, Inc., New York, N. Y., a corporation of New York No Drawing. Application January 5, 1934, Serial No. 705,460. In Germany January 7, 1933

6 Claims. (Cl. 167—72)

This invention relates to a stabilized solid hydrogen peroxide preparation and to a process of preparing the same.

Hydrogen peroxide is known to exert a remarkable antiseptic, disinfecting and deodorizing power and has been used for such purposes in dilute aqueous solution, for instance, as a gargle. Solid derivatives or addition compounds of hydrogen peroxide, for instance, a hydrogen peroxide-urea compound, have also been manufactured, but the high hydrogen peroxide concentration in such solid hydrogen peroxide addition compounds would cause irritating effects, for instance, when using such solid preparations directly for disinfecting human mucous membranes. Therefore, such solid products find practical application only after dissolution in a relatively large quantity of water. The use of hydrogen peroxide in the form of a dilute aqueous solution as a gargle is, however, unsatisfactory in so far as the disinfecting power of the peroxide-oxygen quickly ceases owing to the decomposing influence of the saliva enzymes on the hydrogen peroxide. The necessity to use the hydrogen peroxide in a dilute aqueous solution has the further disadvantage that this antiseptic and disinfecting agent is not available or cannot be used at any place in the form of an aqueous solution as would be the case with a disinfecting mouth-tablet. Such tablets usually are prepared with the addition of sugars, starch, etc. Sugars obviously have not been used hitherto in the manufacture of tablets of hydrogen peroxide or of its solid derivatives in view of the known oxidizing action of hydrogen peroxide and the reducing action of sugars. Experiments further show that mixtures merely consisting of a solid hydrogen peroxide compound and sugar, even if converted into tablets, candies and the like, are relatively hygroscopic. Hence, such preparations show the disadvantage that the hydrogen peroxide is destroyed by humidity after a certain time and the preparation becomes ineffective even if the customary stabilizers of hydrogen peroxide are present in the mixture.

I have now found that by the coaction of certain ingredients solid hydrogen peroxide preparations are obtainable which are practically stable and liberate the hydrogen peroxide only gradually so that the active oxygen is effective over a prolonged period of time. Furthermore, the said new preparation contains the hydrogen peroxide in a dilution which simultaneously with its gradual consumption renders the new preparation suitable as an antiseptic mouth-tablet or the like.

In accordance with my present invention a practically stable hydrogen peroxide preparation of the type specified is obtainable by impregnating a solid hydrogen peroxide compound—which is stabilized in the customary manner—with an inert organic substance, such as paraffin, ceresin, fats of animal or vegetable origin, waxes, for instance, bees wax, the higher fatty acids, for instance, stearic and palmitic acid, the higher alcohols, for instance, wax-alcohols, such as ceryl- and myricyl alcohol or the woolfat alcohols, which substances are used for the impregnating process in their liquid state, that is at somewhat elevated temperature. I prefer the use of hydrogen peroxide-urea as the solid hydrogen peroxide compound but also other solid hydrogen peroxide compounds, for instance, hydrogen peroxide-hexamethylenetetramine, may be used for my new process. As stabilizing agents of hydrogen peroxide those known in the art may be employed, for instance, acids, such as citric and barbituric acid, or urea, ureides, for instance, those of sugars, such as glucose ureide, ether compounds, such as diethylether, hydroxyalkyl ethers, anisol, benzylglycolether, phenyl- or guaiacol-glycerol ether, dioxane, mono - acetylglycolether, chlorphenylglycerol ether and the like.

The plastic mass obtainable in accordance with the above directions is then gradually kneaded with a pulverized sugar, such as glucose, cane sugar, galactose, advantageously with the addition of a polysaccharide, such as starch in a quantity that finally a dry powder-like product is obtained. About 4 to 5 parts of the diluent may, for instance, be required on 1 part of the starting mixture. A certain quantity of sugar or starch may be mixed with the solid hydrogen peroxide compound prior to the impregnating process. Of course, also flavors, such as menthol, anethol, thymol, peppermint oil, citric acid etc. may be added before or after the impregnating step. The impregnation of the hydrogen peroxide compound with the substances of the kind above specified obviously prevents a subsequent decomposition of the hydrogen peroxide by the additional substances, used as diluents to bring the active ingredient to a concentration exerting no irritating action on human mucous membranes. Other substances, for instance, such as are known to have a stabilizing effect on hydrogen peroxide, for instance, glucose or mannose ureide, may also be added on kneading the impregnated mass with the diluent.

The preparation may be prepared, for instance, as follows:—

141 parts by weight of hydrogen peroxide-urea are mixed in the pulverized state with 45 parts by weight of a dry starch while adding about 5 parts by weight of menthol and 3 parts by weight of anethol. The mixture is then impregnated with 58 parts by weight of molten stearic acid which has been heated to about 100° C., while stirring and the mass obtained is kneaded until cold. The plastic mass obtained is then further kneaded first with 67 parts by weight of starch and then gradually with about 870 parts by weight of powdered sugar which advantageously has been mixed with 2 parts by weight of citric acid. A powder-like mass is thus obtained which may be converted into tablets, candies or pills in the usual manner.

In accordance with a further feature of my present invention the capability of penetrating the mucous membranes may be increased in my new preparations by the addition of physiologically inert substances with surface activity, such as silica gel, active charcoal, aluminium hydroxide and kaolin, or dispersing and emulsifying or wetting agents, such as Turkey red oil, water-soluble salts of acid sulfuric acid esters of aliphatic alcohols of high molecular weight, the amides of the higher fatty acids and aminoalkylsulfonic acids as well as esters from the said fatty acids and hydroxyalkyl sulfonic acids, which latter agents have a favorable effect on the foaming power of my new preparation. If desired, other therapeutically active compounds, for instance, anesthetics or other antiseptics or expectorants may be incorporated with my new hydrogen peroxide preparation.

I claim:—

1. A hydrogen peroxide preparation suitable for the manufacture of antiseptic tablets, candies, pills and the like comprising a solid hydrogen peroxide compound containing a stabilizer, which hydrogen peroxide compound has been impregnated with an inert organic substance selected from the group consisting of paraffin, waxes, fats, the higher fatty acids and alcohols, and then mixed with a sugar as a diluent.

2. A hydrogen peroxide preparation suitable for the manufacture of antiseptic tablets, candies, pills and the like comprising a solid hydrogen peroxide compound containing a stabilizer, which hydrogen peroxide compound has been impregnated with an inert organic substance selected from the group consisting of paraffin, waxes, fats, the higher fatty acids and alcohols, and then mixed with starch and a sugar as a diluent.

3. A hydrogen peroxide preparation suitable for the manufacture of antiseptic tablets, candies, pills and the like comprising a solid hydrogen peroxide compound containing starch and a stabilizer, which hydrogen peroxide compound has been impregnated with an inert organic substance selected from the group consisting of paraffin, waxes, fats, the higher fatty acids and alcohols, and then mixed with a sugar as a diluent.

4. A hydrogen peroxide preparation suitable for the manufacture of antiseptic tablets, candies, pills and the like comprising a hydrogen peroxide-urea compound containing a stabilizer, which hydrogen peroxide compound has been impregnated with an inert organic substance selected from the group consisting of paraffin, waxes, fats, the higher fatty acids and alcohols, and then mixed with a sugar as a diluent.

5. A hydrogen peroxide preparation suitable for the manufacture of antiseptic tablets, candies, pills and the like comprising a hydrogen peroxide-urea compound containing a stabilizer, which hydrogen peroxide compound has been impregnated with an inert organic substance selected from the group consisting of paraffin, waxes, fats, the higher fatty acids and alcohols, and then mixed with starch and a sugar as a diluent.

6. A hydrogen peroxide preparation suitable for the manufacture of antiseptic tablets, candies, pills and the like comprising a hydrogen peroxide-urea compound containing benzyl-glycol ether and starch, which hydrogen peroxide compound has been impregnated with stearic acid and then mixed with starch and a sugar as a diluent.

ALFRED RIECHE.